(12) United States Patent
Henderson et al.

(10) Patent No.: US 10,594,253 B2
(45) Date of Patent: Mar. 17, 2020

(54) DISTRIBUTED TORQUE SINGLE AXIS SOLAR TRACKER

(71) Applicant: Kinematics, LLC, Phoenix, AZ (US)

(72) Inventors: Mark Henderson, La Verne, CA (US); Adam Plesniak, Huntington Beach, CA (US); Kyle Zech, Phoenix, AZ (US); Kenneth D Miller, Statesville, NC (US)

(73) Assignee: Kinematics, LLC, Phoenix, AZ (US)

( * ) Notice: Subject to any disclaimer, the term of this patent is extended or adjusted under 35 U.S.C. 154(b) by 0 days.

(21) Appl. No.: 15/886,782

(22) Filed: Feb. 1, 2018

(65) Prior Publication Data

US 2018/0226915 A1    Aug. 9, 2018

Related U.S. Application Data

(60) Provisional application No. 62/453,893, filed on Feb. 2, 2017, provisional application No. 62/568,758, filed on Oct. 5, 2017.

(51) Int. Cl.

| | |
|---|---|
| *H02S 20/32* | (2014.01) |
| *F16H 19/00* | (2006.01) |
| *F16D 41/12* | (2006.01) |
| *F24S 30/425* | (2018.01) |
| *F24S 25/12* | (2018.01) |
| *F16D 63/00* | (2006.01) |
| *F16D 121/18* | (2012.01) |
| *F16D 121/02* | (2012.01) |
| *F16D 55/22* | (2006.01) |
| *F24S 30/00* | (2018.01) |

(52) U.S. Cl.
CPC .............. *H02S 20/32* (2014.12); *F16D 41/12* (2013.01); *F16H 19/001* (2013.01); *F24S 25/12* (2018.05); *F24S 30/425* (2018.05); *F16D 55/22* (2013.01); *F16D 63/006* (2013.01); *F16D 2121/02* (2013.01); *F16D 2121/18* (2013.01); *F24S 2030/11* (2018.05); *F24S 2030/15* (2018.05); *F24S 2030/19* (2018.05)

(58) Field of Classification Search
None
See application file for complete search history.

(56) References Cited

U.S. PATENT DOCUMENTS

| | | | |
|---|---|---|---|
| 7,531,741 B1* | 5/2009 | Melton | H02S 20/32 136/246 |
| 2006/0090789 A1* | 5/2006 | Thompson | H02S 20/00 136/246 |
| 2016/0329860 A1* | 11/2016 | Kalus | F24S 30/425 |

* cited by examiner

*Primary Examiner* — Eli S Mekhlin
(74) *Attorney, Agent, or Firm* — Wilson Sonsini Goodrich & Rosati

(57) ABSTRACT

A distributed torque, single axis solar tracking system includes a plurality of spaced apart mounting posts with selected posts having an electrically controlled actuator mounted thereon. A torque structure extends between the actuators to distribute rotational torque on the torque structure. A plurality of solar panels is connected to the torque structure. Electrical apparatus is coupled to each actuator and designed to be coupled to a power source so that when the electrical apparatus is coupled to the power source, the plurality of actuators is energized to rotate simultaneously a desired amount. Whereby the plurality of solar panels is rotated the desired amount as the plurality of actuators rotates.

10 Claims, 10 Drawing Sheets

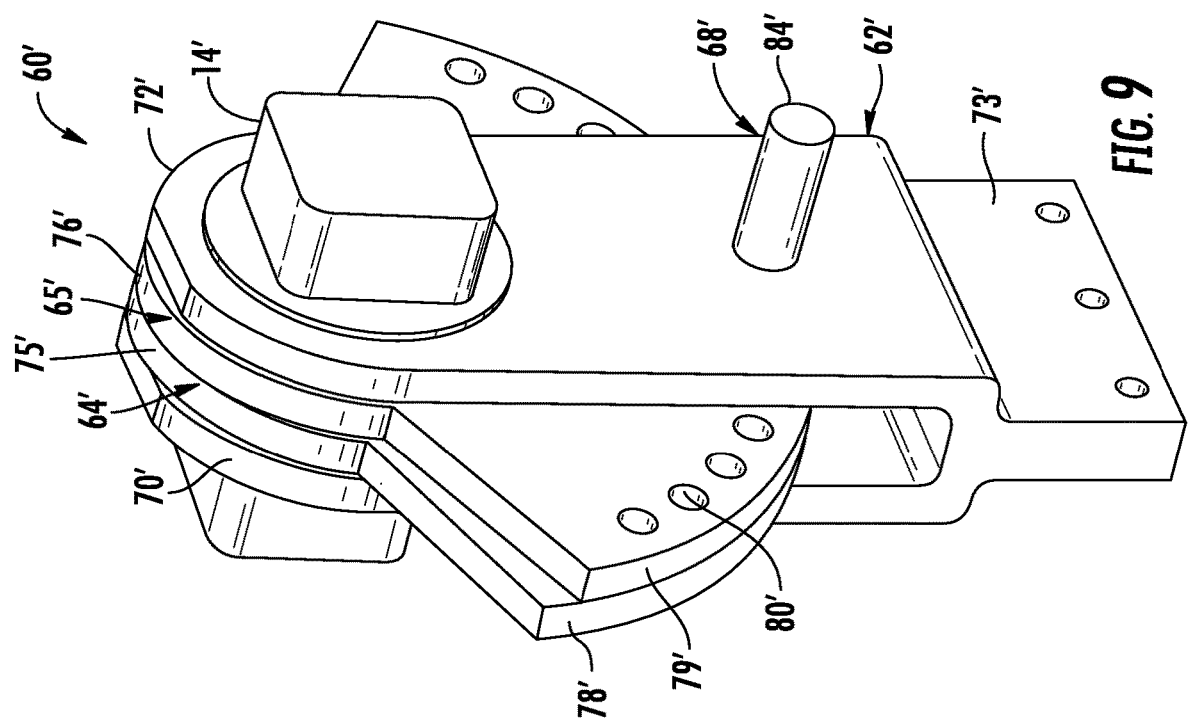
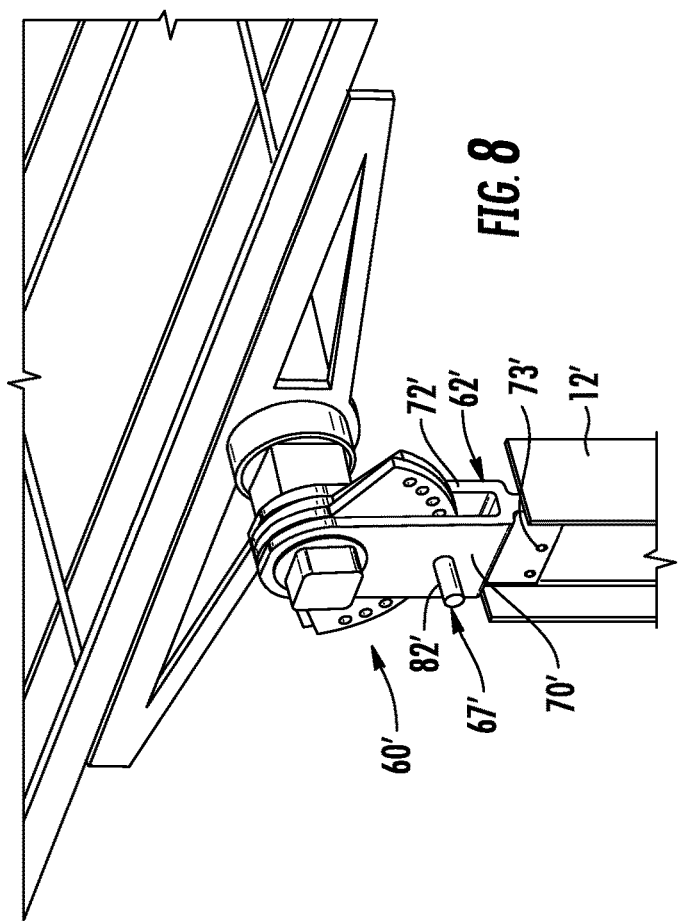

DISTRIBUTED TORQUE SINGLE AXIS SOLAR TRACKER

CROSS-REFERENCE TO RELATED APPLICATION

This application claims the benefit of U.S. Provisional Patent Application No. 62/453,893, filed Feb. 2, 2017 and U.S. Provisional Patent Application No. 62/568,758, filed Oct. 5, 2017.

FIELD OF THE INVENTION

This invention relates to solar trackers.

More particularly, the present invention relates to actuation of solar trackers.

BACKGROUND OF THE INVENTION

Solar trackers direct solar panels or modules toward the sun as the sun moves through the sky. These devices change their orientation throughout the day to follow the sun's path and maximize energy capture. In photovoltaic systems, trackers help minimize the angle of incidence (the angle that a ray of light makes with a line perpendicular to the surface) between the incoming light and the panel. This greatly increases the amount of energy the panels produce. In particular, single axis solar trackers rotate solar panel/panels about a single axis. There are different types of single axis trackers include horizontal, vertical, tilted, and polar aligned, each rotate supported panels about a single axis.

While single axis solar trackers are highly effective in reducing the angle of incidence throughout the movement of the sun, cost issues exist. It is desirable to reduce the cost of the energy generated by solar panels in order to make them economically effective. One of the main costs of producing solar power is the actual equipment employed. Photovoltaic panels are under continuous development to increase performance and reduce cost to make them more economically effective. Additionally, the support structures in a single axis tracker system contribute to that cost.

It would be highly advantageous, therefore, to remedy the foregoing and other deficiencies inherent in the prior art.

Accordingly, it is an object of the present invention to provide a new and improved distributed torque, single axis solar tracking system.

It is another object of the present invention to provide a new and improved distributed torque, single axis solar tracking system that generates torque simultaneously in a plurality of spaced apart actuators.

It is another object of the present invention to provide a new and improved distributed torque, single axis solar tracking system that is lighter and less expensive than prior art tracking systems.

It is another object of the present invention to provide a new and improved distributed torque, single axis solar tracking system that includes supporting elements such as bearings, fasteners and posts of reduced size while still providing strength in the worst case highest torque values.

SUMMARY OF THE INVENTION

Briefly to achieve the desired objects and advantages of the instant invention an embodiment of a distributed torque, single axis solar tracking system is provided. The system includes a plurality of spaced apart mounting posts with selected posts having an electrically controlled actuator mounted thereon. A torque structure extends between the actuators to evenly distribute rotational torque on the torque structure. A plurality of solar panels is connected to the torque structure. Electrical apparatus is coupled to each actuator and designed to be coupled to a power source so that when the electrical apparatus is coupled to the power source, the plurality of actuators is energized to rotate simultaneously a desired amount. Whereby the plurality of solar panels is rotated the desired amount as the plurality of actuators rotates.

The desired objects and advantages of the instant invention are further achieved in a preferred embodiment of a distributed torque, single axis solar tracking system. The system includes a plurality of spaced apart mounting or support posts with intermittent posts of the plurality of posts being selected posts with intermediate posts positioned between selected posts. A plurality of electrically controlled actuators, one each of the plurality of electrically controlled actuators mounted on the selected posts of the plurality of posts, each actuator of the plurality of actuators including an electrically energizable rotatably mounted slew drive, and the slew drive in each actuator of the plurality of actuators including and being driven by an electric motor. Each of the two intermediate posts has one of a damper device, a locking device, or a bearing member mounted thereon. A torque structure extends between the plurality of actuators to evenly distribute rotational torque on the torque structure, the torque structure being attached to the rotatably mounted slew drive for rotation therewith. A plurality of solar panels is connected to the torque structure, the plurality of solar panels including one solar panel of the plurality of solar panels situated between each adjacent pair of mounting or support posts of the plurality of spaced apart mounting or support posts. Electrical apparatus is coupled to the electric motor of each actuator of the plurality of actuators and designed to be coupled to a power source, the electrical apparatus, when coupled to the power source, energizing the electric motors of the plurality of actuators to rotate simultaneously a desired amount, whereby the plurality of solar panels is rotated the desired amount as the plurality of actuators rotates.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 8 is an enlarged partial perspective view of a portion of the distributed torque single axis solar tracker system of FIG. 4 illustrating a locking device;

FIG. 9 is an enlarged perspective view of the locking device of FIG. 8;

DETAILED DESCRIPTION OF A PREFERRED EMBODIMENT

In large installations, single axis solar trackers include a single torque tube which extends across a plurality of posts, supporting one or more panels or modules between each post. An actuator such as a slew drive is coupled to the torque tube at one end or somewhere intermediate the ends. This slew drive is used to rotate the torque tube around its longitudinal axis. While this does work, the torque produced on the torque tube as its length increases is proportional. Thus, the torque tube, which is typically steel, must be made with a constant thickness, and thus strength, capable of handling the highest torque values despite these values only being present in a short section of the torque tube. Furthermore, supporting elements of the torque tube such as bearings, fasteners and posts must also be sized for strength in the worst case highest torque values. This presents a heavy and costly item. Additionally, since torque is generated at a single post (e.g. mounting post), the post and actuator must also be sufficiently strong to actuate the entire tracker to the worst case highest torque values.

Figure 1:
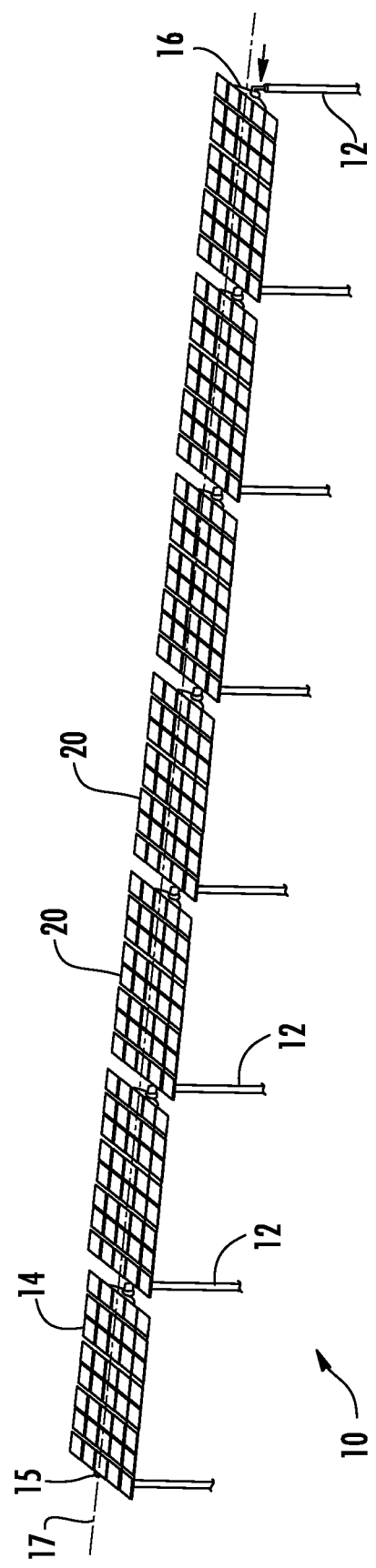
FIG. 1 is a perspective view of a distributed torque single axis solar tracker according to the present invention.

Turning now to the drawings in which like reference characters indicate corresponding elements throughout the several views, attention is directed to FIG. 1 which illustrates a distributed torque single axis solar tracker generally designate 10. Tracker 10 includes a plurality of linearly spaced apart mounting or support posts 12. A torque structure 14 extends across the plurality of posts 12 and is rotationally coupled to each. While torque structure 14 is a tubular structure in this embodiment, it will be understood that torque structure 14 can be any element having a length, including tubes, solid rods and bars, structure simply connecting adjacent solar panels, etc. all of which are included in the generic term "torque structure". However, a tube is preferred as it can be constructed much lighter and stronger than a solid element (e.g. steel rod or the Like). Torque structure 14 includes opposing ends 15 and 16, and a longitudinal axis of rotation 17 extending there between. It will be understood that torque structure 14 can be a single continuous length or constructed of a plurality of segments. It will be understood that the number of posts 12 and the length of torque structure 14 is determined by the size and number of solar panels supported.

Figure 2:
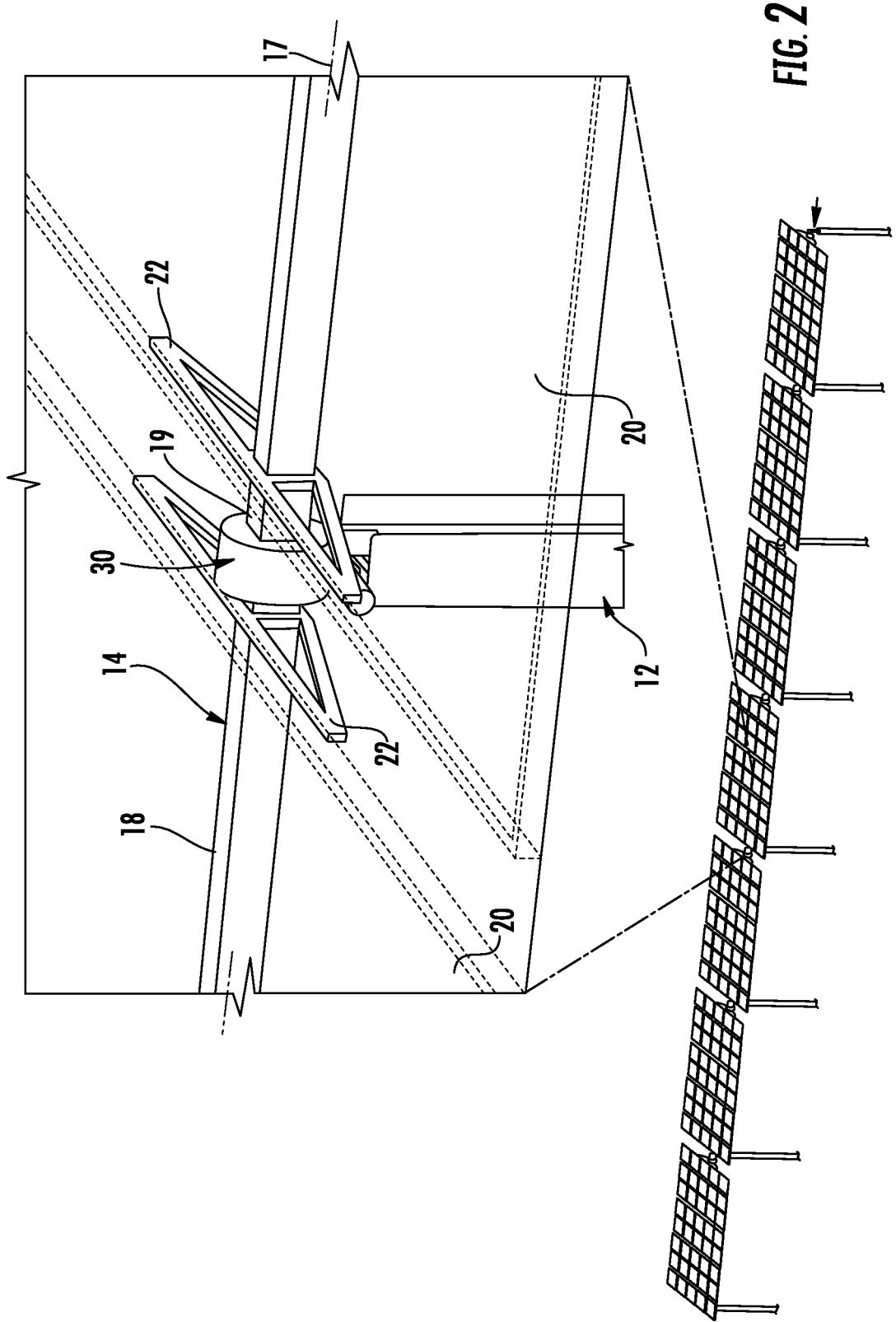
FIG. 2 is an enlarged partial perspective view of a portion of the distributed torque single axis solar tracker of FIG. 1.

With additional reference to FIG. 2, torque structure 14 further includes panel portions 18 positioned intermediate posts 12, and torque tube structure portions 19 between panel portions 18 and overlying posts 12. Panel portions 18 are coupled to and support solar panels 20. In this embodiment, solar panels 20 are coupled to torque structure 14 with brackets 22. Thus, as torque structure 14 is rotated about longitudinal axis of rotation 17, panels 20 are rotated to maximize solar collection. The angle at which solar panels 20 are coupled to torque structure 14 determines whether solar tracker 10 is considered a horizontal, vertical, or tilted solar tracker. Illustrated in the figures is a horizontal solar tracker.

In conventional single axis tracker systems, a torque tube is rotated by employing an actuator such as a slew drive to turn the torque tube at one position. Distributed torque single axis solar tracker 10 of the present invention, employs a plurality of actuators 30 to rotate torque structure 14 at multiple points, preferably evenly spaced along the length thereof. In the preferred embodiment, an actuator 30 is mounted at the top of each post 12 and coupled to torque structure 14 at torque structure portion 19. The use of multiple actuators 30 distributes the torque on torque structure 14 between the multiple actuators and posts 12, reducing the forces on all of the parts, and in particular reducing the forces on torque structure 14. By distributing the torque, smaller, lighter, and less expensive actuators can be employed. Additionally, torque structure 14 can be reduced in strength, saving the cost of materials and reducing weight. In turn, since a lighter torque structure is employed, the strength of posts 12 can also be reduced, saving more material costs.

Figure 3:
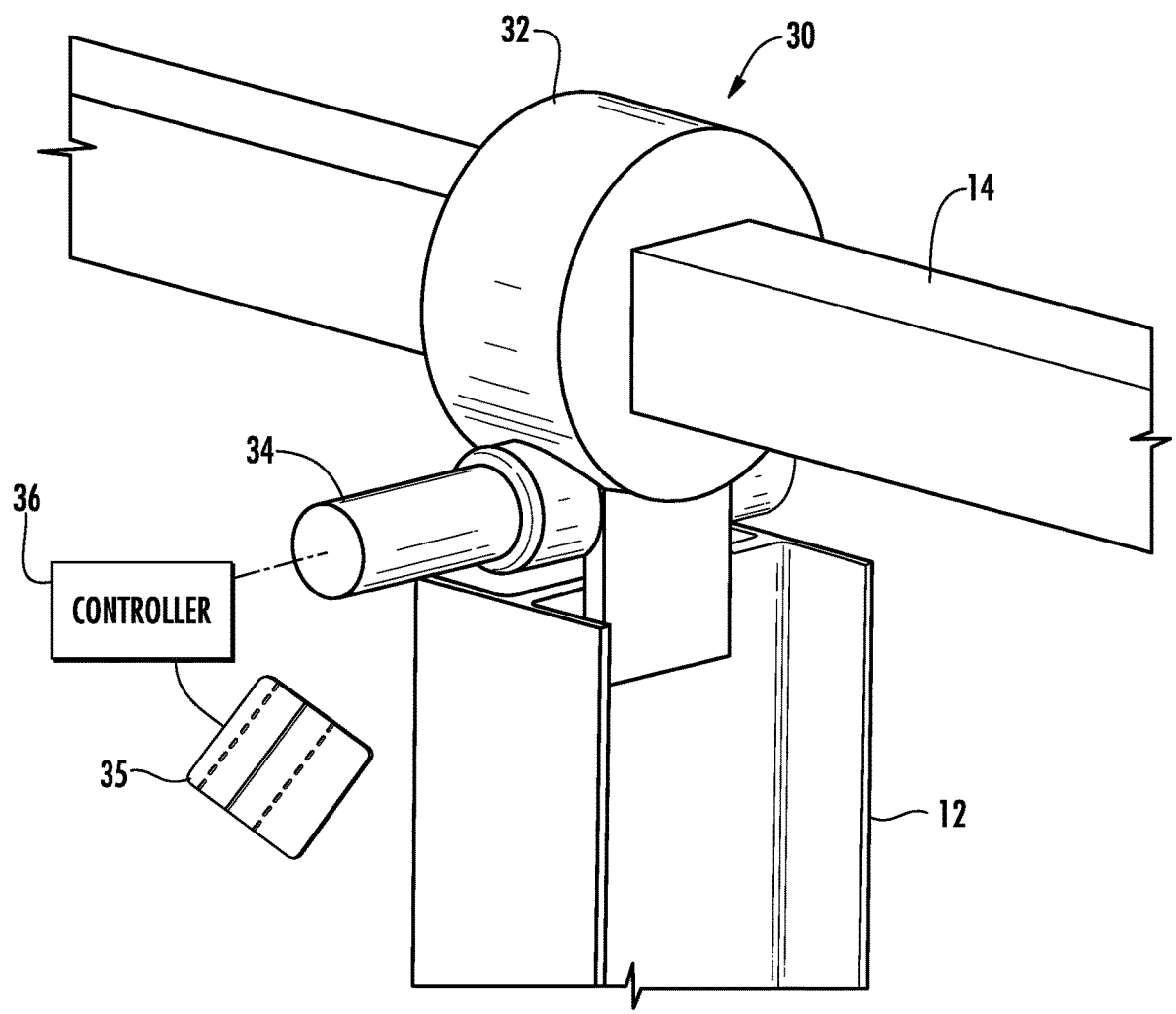
FIG. 3 is an enlarged partial perspective view of an actuator of the distributed torque single axis solar tracker of FIG. 1.

Turning now to FIG. 3, an actuator 30 is illustrated mounted on the top of post 12. Actuators 30 can include numerous different devices, but in the preferred embodiment illustrated, each include a slew drive 32 and a motor 34 coupled thereto. It will be understood that the actuators can also be driven by mechanical means which may or may not be actuated electrically. A power source 35 and a controller 36 are coupled to actuators 30. It will be understood that numerous styles of slew drives can be employed, but it is intended for them to be reduced in strength and power (such as ¹⁄₁₀ the size) since less torque needs to be generated. Additionally, motor 34 can include brushed or brushless DC motors and the like. Power source 35 can be a plugged DC/AC connection, battery powered, or a small PV panel with battery and charge controller circuitry. Torque structure 14 can pass directly through slew drive 32, or can consist of segments ending at and extending from slew drives 32.

Figure 4:
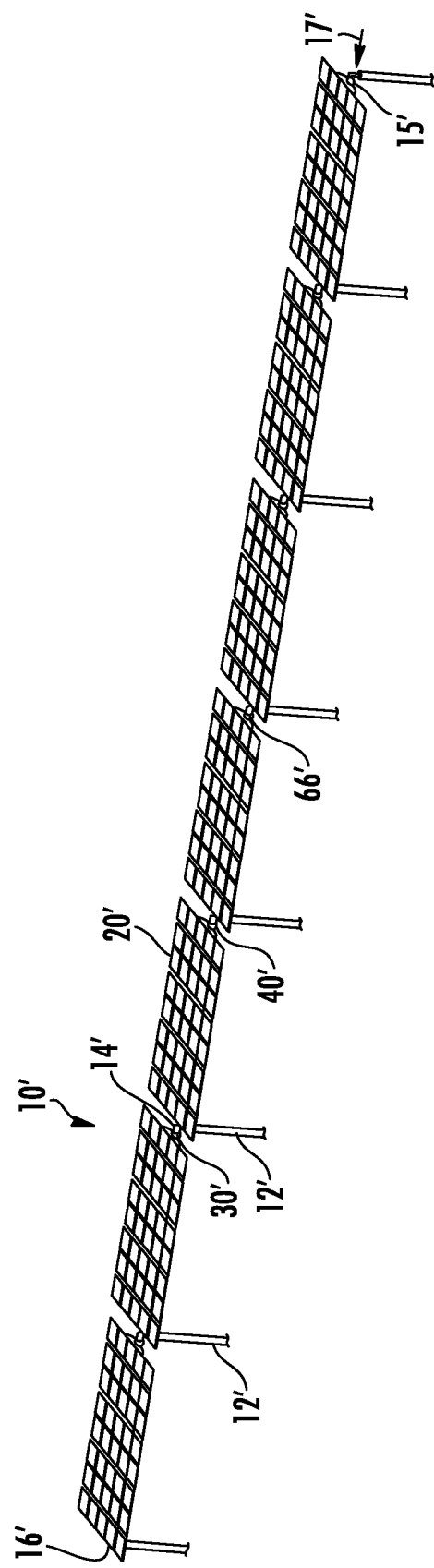
FIG. 4 is a perspective view of another embodiment of a distributed torque single axis solar tracker system according to the present invention.

Turning now to FIG. 4 which illustrates another embodiment of a distributed torque single axis solar tracker system generally designate 10'. In the description of this embodiment the various components which are similar to the components in the system illustrated in FIG. 1 are designated with the same number and a prime (') is added to all of the numbers to indicate the different embodiment. Tracker system 10' includes a plurality of linearly spaced apart posts 12'. A torque structure 14', which can be a tubular member or a solid axle as shown, extends across the plurality of posts 12' and is rotationally coupled to each. Torque structure 14' includes opposing ends 15' and 16', and a longitudinal axis of rotation 17' extending there between. It will be understood that torque structure 14' can be a single continuous length or constructed of a plurality of segments. It will be understood that the number of posts 12' and the length of torque structure 14' is determined by the size and number of solar panels 20' supported thereby.

Figure 5:
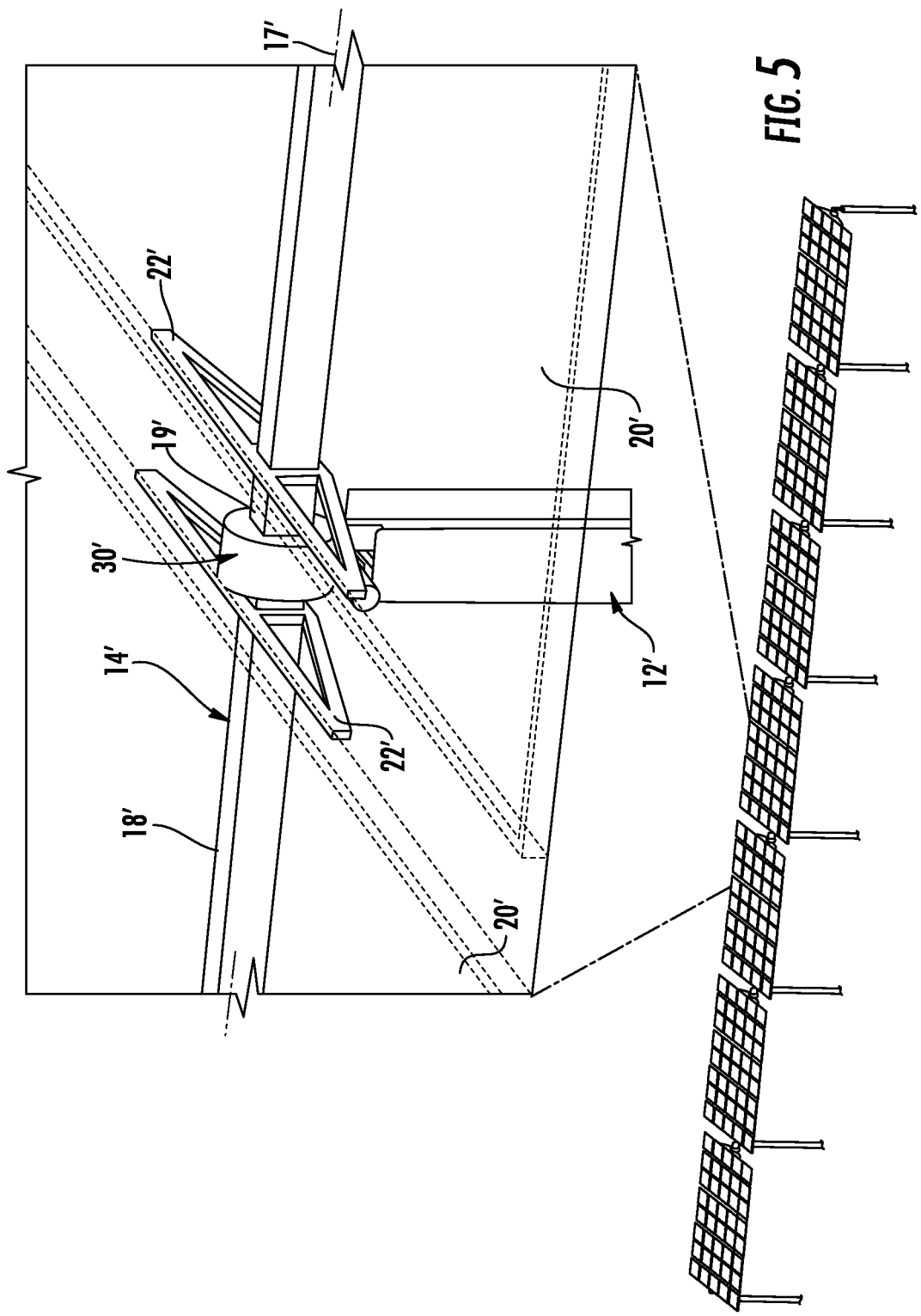
FIG. 5 is an enlarged partial perspective view of a portion of the distributed torque single axis solar tracker system of FIG. 4.

With additional reference to FIG. 5, torque structure 14' further includes torque structure panel portions 18' positioned intermediate posts 12', and torque structure intermediate portions 19' between panel portions 18' and overlying posts 12'. Panel portions 18' are coupled to and support solar panels 20'. In this embodiment, solar panels 20' are coupled to torque structure 14' with brackets 22'. Thus, as torque structure 14' is rotated about longitudinal axis of rotation 17', panels 20' are rotated to maximize solar collection. The angle at which solar panels 20' are coupled to torque structure 14' determines whether solar tracker 10' is considered a horizontal, vertical, or tilted solar tracker. The solar tracker illustrated in FIG. 4 is a horizontal solar tracker.

In conventional single axis tracker systems, the torque tube is rotated by employing an actuator such as a slew drive to turn the torque at one position. Distributed torque single axis solar tracker 10' of the present invention, employs a plurality of actuators 30' to rotate torque tube structure 14' at multiple points. In this embodiment, actuators 30' are mounted on every third post 12' so as to be interspersed with damper devices 40' and lock devices 60', one each of which are mounted on the intermediate posts. In the embodiment illustrated, actuators 30' are mounted at the top of post 12' and coupled to torque structure 14' at torque structure portion 19'. The use of multiple actuators 30' distributes the torque on torque structure 14' between the multiple actuators and posts 12', reducing the forces on all of the parts, an in particular reducing the forces on torque structure 14'. By distributing the torque, smaller, lighter, and less expensive actuators can be employed. Additionally, torque structure 14' can be reduced in strength, saving the cost of materials and reducing weight. In turn, since a lighter torque structure is employed, the strength of posts 12' can also be reduced, saving more material costs. In the embodiment illustrated, actuators 30' are positioned with two posts 12' therebetween. The two intermediate posts carry a damper device 40' and a locking device 60'. The number and periodicity of the actuator 30', damper device 40' and locking device 60' can be altered as desired for the conditions at the specific location. It will be understood that a simple bearing member that allows for rotation of torque structure 14' can also be employed in place of one or more of actuators 30', damper devices 40' and lock devices 60'. This provides a single axis solar tracker system 10' with distributed actuation, dampening and locking devices across the product to react to torque and dynamics across sections of the system, as opposed to a single actuator responding to torque of the entire system through hardware coupling. In this specific embodiment, each post 12' has an actuator 30', a damper device 40' or a locking device 60' mounted thereon. Preferably, the actuators are evenly or periodically spaced along the torque structure and may be on every post, or have one or more of a damper device, a locking device, a bearing member, or nothing situated on intermediate posts between the actuators. This allows for smaller beams and other hardware in other parts of the tracker (since torque is coupled at each post and not transmitted to a single actuator and post). Additionally, damping of natural resonance tendencies is provided as well as the ability to lock the system in each incremented position, as will be described presently.

Figure 7:
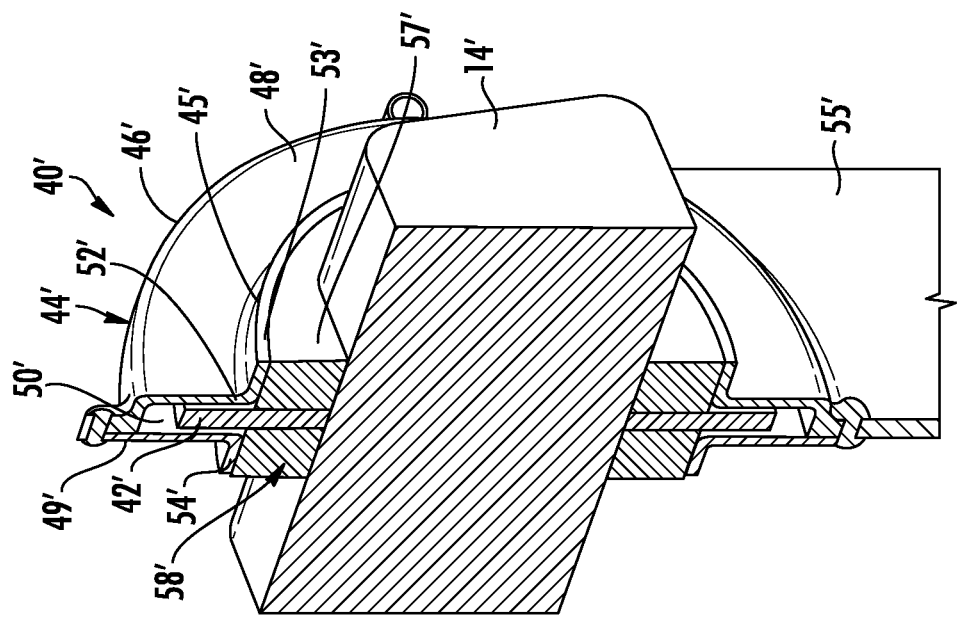
FIG. 7 is a sectional view of the damper device of FIG. 6.
Figure 6:
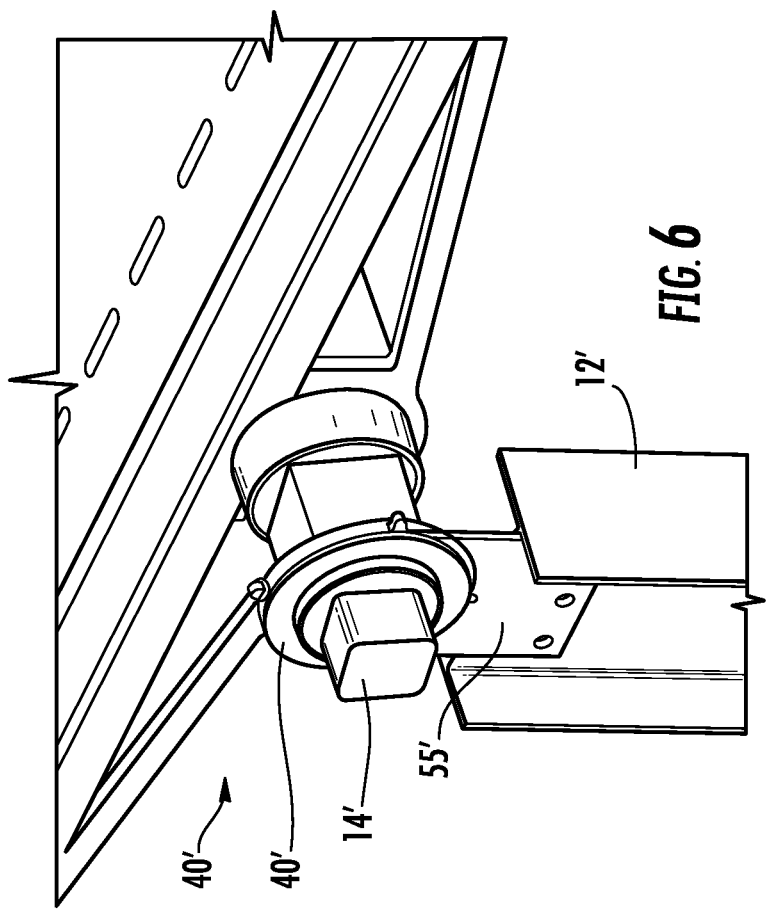
FIG. 6 is an enlarged partial perspective view of a portion of the distributed torque single axis solar tracker system of FIG. 4 illustrating a damper device.

Turning now to FIGS. 6 and 7, damper device 40' is illustrated carried on torque structure intermediate portion 19' of torque structure 14'. Damper device 40' is a rotational damper and is designed as a silicone gel/oil damper, which can also use "non-Newtonian fluid" and "dampening material" such as KIO|LOPOISE dampening grease, with interface features to allow for integration into solar tracker system 10'. Damper device 40' is designed as a passive device with no electrical actuation required. Damper 40' includes an internal friction plate 42' carried by torque structure 14' (in this embodiment a solid steel axle having a square cross-section) and rotatable therewith. Friction plate 42' is partial enclosed by an annular housing 44' having an inner periphery 45' and an outer periphery 46'. Annular housing 44' includes an annular top plate 48' and an annular bottom plate 49' encircling torque structure 14'. Annular top plate 48' and annular bottom plate 49' are fastened together at outer periphery 46', forming an inner volume 50' therebetween with a gap 52' at the inner periphery 45'. Friction plate 42' extends through gap 52' into inner volume 50', leaving a space surrounding friction plate within housing 44'. Silicone gel/oil is placed in inner volume 50' in the space between housing 44' and friction plate 42'. The shear friction force of the gel against the relative rotation between housing 44' and friction plate 42' provides a dampening effect against motion on torque tube structure 14'.

Flanges 53' and 54' extend outwardly from annular top plate 48' and annular bottom plate 49', respectively, proximate gap 52'. Annular housing 44' includes an interface member 55' extending downwardly from outer periphery 46' therefrom, and preferably from annular top plate 48'. Interface member 55' facilitates attachment of damper device 40' to posts 12'. Interface member 55' is preferably a flat sheet of material fastened to posts 12' by fasteners such as screws, rivets and the like or welding, adhesives and the like. Seal members 57' and 58' are positioned between housing 44' and torque structure 14', to retain the silicone gel/oil within housing 44'. Seal members engage and rotate with torque structure 14' and friction plate 42', while engaging and rotating relative flanges 53' and 54', respectively, of housing 44'. Seal members 57' and 58' can be substantially any type of bushing, bearing, seal and the like, such as slip bearing, polymer bearing, and the like.

Turning now to FIGS. 8 and 9, locking device 60' is illustrated. Locking device 60' includes a base 62' carrying offset lock plates 64' and 65', and lock mechanisms 67' and 68'. Base 62' includes a bifurcated end with parallel arms 70' and 72' and an interface end 73'. Interface end 73' is affixed to posts 12'. Interface member end 73' is preferably a flat portion fastened to posts 12' by fasteners such as screws, rivets and the like or welding, adhesives and the like. Apertures are formed in arms 70' and 72' for receiving torque structure 14' therethrough. Bearings couple arms 70' and 72' to torque structure 14' to allow relative rotation therebetween.

Lock plates 64' and 65' have an end 75' and 76', respectively coupled to and rotating with torque structure 14' between arms 70' and 72'. Lock plates 64' and 65' have an opposing end 78' and 79', respectively, that is widened to include a plurality of spaced apart apertures 80' positioned in an arc separated by 10 degrees. Lock plates 64' and 65' are interfaced to torque structure 14', where each plate has apertures 80' at 10 degree increments and the plates are offset to each other by 5 degrees. Lock mechanisms 67' and 68' include electrically activated solenoid pins 82' and 84' which are positioned on both sides of base 62', giving lock device 60' the ability to lock in 5 degree increments by activating a pin on alternating sides of base 62'. When the tracker is not moving, the respective pin extends concurrently through an aperture 85' formed in arms 70' and 72' and one of apertures 80' in the respective lock plate. This allows torque structure 14' to transmit torque to post 12' via shear in the engaged pin. Solenoid pins 82' and 84' are activated extended and retracted via a signal/power wire harness extending from a tracker electronic control system. Shear force in the pin between base 62' and the engaged lock pin transfers torque from torque structure 14' to post 12'.

Figure 10:
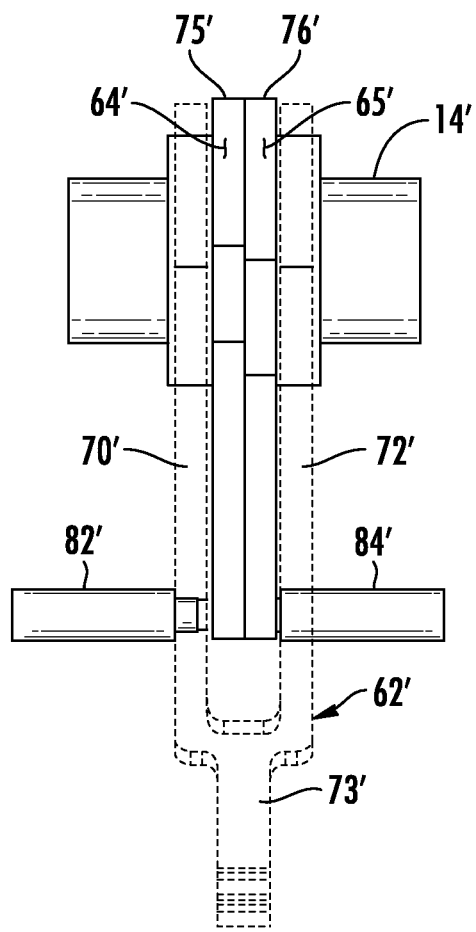
FIG. 10 is a plan view of the locking device.

Turning now to FIG. 10, lock device 60' is intended to stop the motion of torque structure 14' in 5 degree increments by combining two locking plates 64' and 65' each having apertures 80' separated by 10 degrees. By offsetting plates 64' and 65' by 5 degrees, apertures are in effect separated by 5 degrees when alternating between the two plates using solenoid pins on either side of base 62'. This allows for three operating modes, which are illustrated in FIGS. 11-13.

Figure 11:
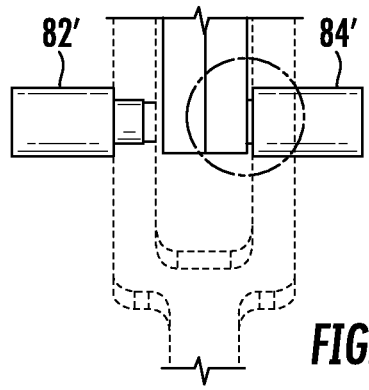
FIGS. 11-13 illustrate different modes of the locking device.

Referring specifically to FIG. 11, in one mode of operation, the right solenoid pin is extended, preventing motion through shear on the solenoid pin against the right lock plate and the right base arm.

Figure 12:
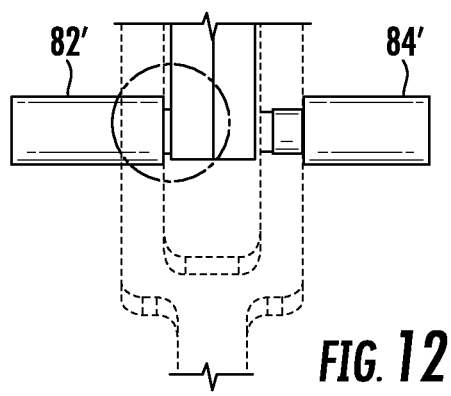

Referring specifically to FIG. 12, in another mode of operation, the left solenoid pin is extended, preventing motion through shear on the solenoid pin against the left lock plate and the left base arm.

Figure 13:
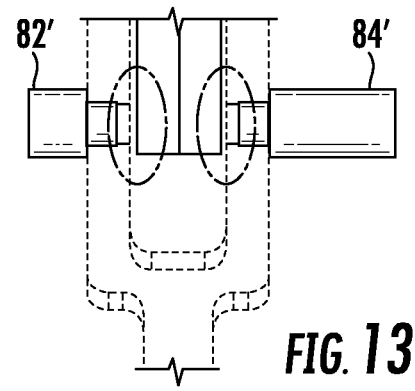

Referring specifically to FIG. 13, in yet another mode of operation, both left and right solenoid pins are retracted, allowing for free rotation of the lock plates to another position.

Figure 14:
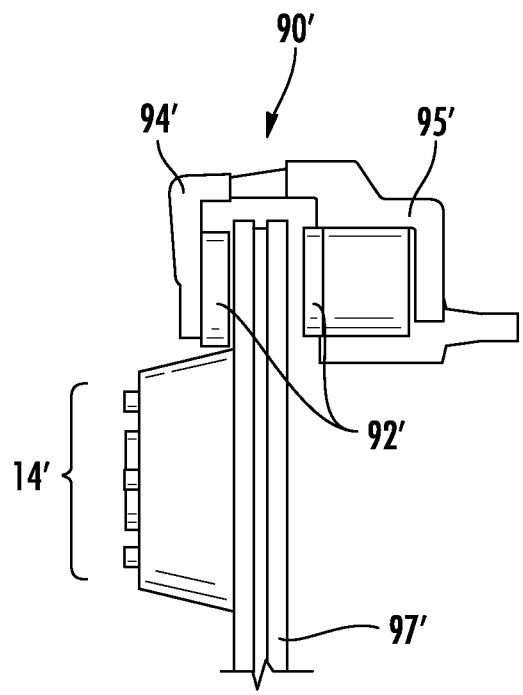
FIG. 14 is a side view of an alternative lock device.

Turning now to FIG. 14, another embodiment of a locking device is illustrated. In this embodiment, the locking device is a braking system lock 90' including brake pads 92' actuated hydraulically or electrically such as using a caliper 94' and piston 95' to provide force against a plate 97' connected to torque structure 14'. The friction created by the pad against the plate prevents rotation of the system when rotation is not desired.

Figure 15:
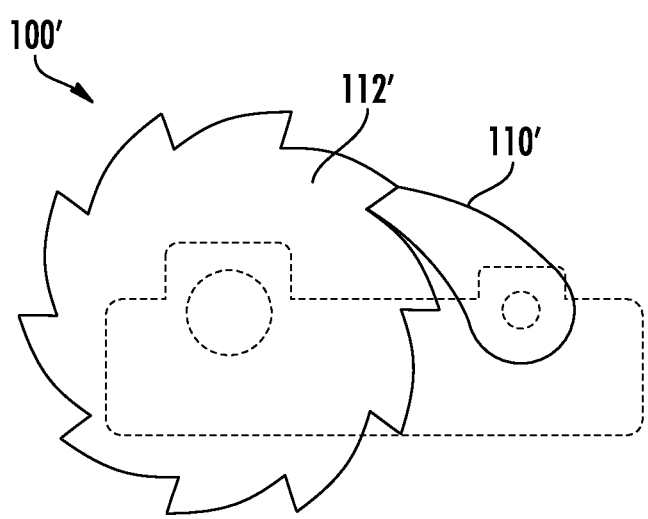
FIG. 15 is a side view of yet another lock device.

Turning now to FIG. 15, yet another embodiment of a locking device is illustrated. In this embodiment, a ratchet system lock 100' including a ratchet 110' is used to prevent motion when engaged with a plate 112' attached to torque structure 14' (sometimes referred to as a ratchet and pawl). Two plates with opposite ratchet markings could be used to achieve prevention of motion in both directions, with electrical actuation on the ratchet to allow for motion when desired.

Figure 16:
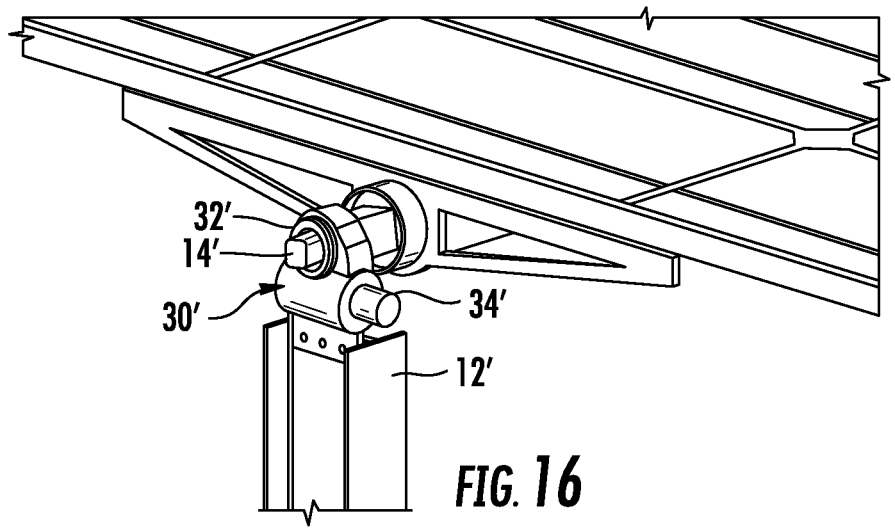
FIG. 16 is an enlarged partial perspective view of a portion of the distributed torque single axis solar tracker system of FIG. 4 illustrating an actuator.
Figure 17:
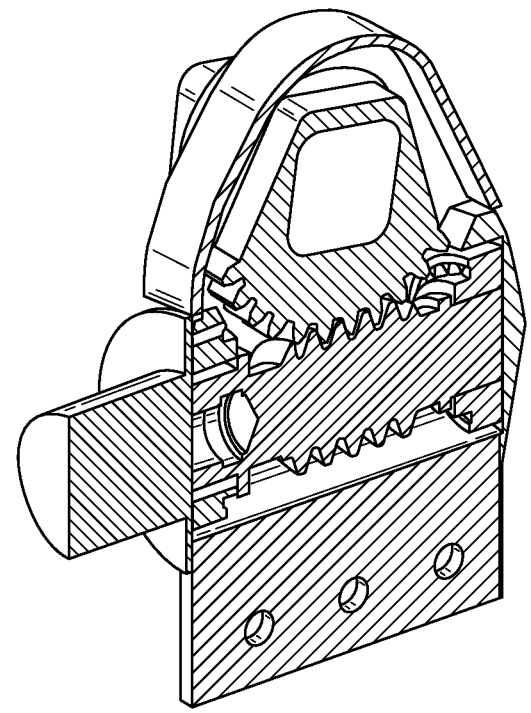
FIG. 17 is a sectional view of the actuator of FIG. 16.

Turning now to FIGS. 16 and 17, an actuator 30' is illustrated mounted on the top of post 12'. Actuators 30' can include numerous different devices, but in the preferred embodiment illustrated each includes a slew drive 32' and a motor 34' coupled thereto. Actuator 30' is fully described in co-pending provisional application Ser. No. 65/522,442 included herein by reference.

Thus a new and improved distributed torque, single axis tracker system is disclosed. The new and improved distributed torque, single axis tracker system includes an extended torque structure supported and driven at multiple points along its length to distribute weight and torque along its length. The new and improved distributed torque, single axis tracker system is designed to generate torque simultaneously in a plurality of spaced apart actuators to distribute the torque substantially equally along its length. In one specific example, every third post of a plurality of posts is selected to have an actuator mounted thereon and the intermediate posts have one of a damper device, a locking device, or a bearing member mounted thereon. Accordingly, the new and improved distributed torque, single axis tracker system is lighter and less expensive than prior art tracking systems and includes supporting elements such as bearings, fasteners and posts of reduced size while still providing strength in the worst case highest torque values.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A single axis solar tracking system comprising:
   a plurality of posts extending and spaced apart longitudinally along an axis;
   a plurality of actuators supported on a set of intermediate posts selected from the plurality of posts, wherein each actuator of the plurality of actuators is supported on an individual intermediate post;
   a torque structure extending longitudinally along the axis and extending between the plurality of actuators to receive and evenly distribute rotational torque produced from the plurality of actuators along a length of the axis;
   a plurality of solar panels connected to the torque structure, wherein the plurality of actuators with aid of the torque structure are configured to rotate the plurality of solar panels simultaneously along and about the axis by a desired amount; and
   a damper device provided on one or more of the intermediate posts, wherein the damper device comprises a friction plate carried by the torque structure and rotatable therewith, the friction plate being partially enclosed by an annular housing, wherein a silicone gel is provided in a space between the annular housing and the friction plate, and wherein the damper device provides a dampening effect against motion on the torque structure via shear friction force of the silicone gel against relative rotation between the annular housing and the friction plate.

2. The system of claim 1, wherein each of the intermediate posts has a locking device or a bearing member mounted thereon.

3. The system of claim 2, wherein the locking device includes a bifurcated base with parallel arms rotatably mounted to the torque structure, wherein a pair of laterally opposing lock plates is positioned between the parallel arms and attached to the torque tube structure for rotation therewith, each of the lock plates having a series of holes formed in a distal or opposing end, the series of holes in one lock plate being offset from the series of holes in the other lock plate, and wherein the locking device further includes electrically activated solenoids positioned on opposite sides of the bifurcated base, the solenoids having pins that are configured to be activated and positioned to (i) engage in one or more of the series of holes and (ii) lock the pair of laterally opposing lock plates during the rotation of the plurality of solar panels.

4. The system of claim 3, wherein the holes in the series of holes in each of the lock plates are offset from each other by a first angular increment of 10 degrees and wherein the series of holes in one lock plate is offset from the series of holes in the other lock plate by a second angular increment of 5 degrees.

5. The system of claim 2, wherein the locking device includes a ratchet and pawl.

6. The system of claim 1, wherein the plurality of actuators includes an electrically-driven rotatable element, and wherein the torque structure is attached to the electrically-driven rotatable element for rotation therewith.

7. The system of claim 6, wherein the electrically-driven rotatable element includes a slew drive.

8. The system of claim 7, wherein the slew drive includes an electric motor.

9. The system of claim 8, further comprising: a controller coupled to the electric motor and configured to control the electric motor.

10. The system of claim 1, wherein the plurality of solar panels includes at least one solar panel that is situated between an adjacent pair of posts.

\* \* \* \* \*